(12) United States Patent
Wuu et al.

(10) Patent No.: US 10,303,398 B2
(45) Date of Patent: May 28, 2019

(54) SWIZZLING IN 3D STACKED MEMORY

(71) Applicant: ADVANCED MICRO DEVICES, INC., Sunnyvale, CA (US)

(72) Inventors: John Wuu, Fort Collins, CO (US); Michael K. Ciraula, Fort Collins, CO (US); Russell Schreiber, Austin, TX (US); Samuel Naffziger, Fort Collins, CO (US)

(73) Assignee: Advanced Micro Devices, Inc., Santa Clara, CA (US)

(*) Notice: Subject to any disclaimer, the term of this patent is extended or adjusted under 35 U.S.C. 154(b) by 0 days.

(21) Appl. No.: 15/794,457

(22) Filed: Oct. 26, 2017

(65) Prior Publication Data

US 2019/0129651 A1 May 2, 2019

(51) Int. Cl.
*G11C 5/06* (2006.01)
*G06F 3/06* (2006.01)
*G06F 12/1009* (2016.01)

(52) U.S. Cl.
CPC .......... *G06F 3/0659* (2013.01); *G06F 3/0611* (2013.01); *G06F 3/0613* (2013.01); *G06F 3/0673* (2013.01); *G06F 12/1009* (2013.01); *G06F 2212/202* (2013.01)

(58) Field of Classification Search
CPC ........... G11C 5/025; G11C 5/04; G11C 5/063; G11C 7/18; G11C 11/4097
USPC ...................................... 365/51, 63
See application file for complete search history.

(56) References Cited

U.S. PATENT DOCUMENTS

| 2012/0173841 | A1* | 7/2012 | Meier | G06F 12/1009 711/202 |
| 2013/0336039 | A1* | 12/2013 | Frans | G11C 5/02 365/51 |
| 2015/0348613 | A1* | 12/2015 | Vogelsang | G11C 5/025 365/51 |

* cited by examiner

*Primary Examiner* — Son T Dinh

(57) ABSTRACT

A processing system includes a compute die and a stacked memory stacked with the compute die. The stacked memory includes a first memory die and a second memory die stacked on top of the first memory die. A parallel access using a single memory address is directed towards different memory banks of the first memory die and the second memory die. The single memory address of the parallel access is swizzled to access the first memory die and the second memory die at different physical locations.

20 Claims, 4 Drawing Sheets

SWIZZLING IN 3D STACKED MEMORY

BACKGROUND

Three-dimensional (3D) circuit integration often includes horizontally and/or vertically stacked devices to provide improved communication between stacked dies and to reduce the area occupied by the stacked devices. For example, coupled layers of memory elements (referred to as 3D stacked memory, or stacked memory) may be utilized in memory devices. With a number of interconnects between a processor and the memory no longer constrained by off-chip pin counts with 3D integration, multiple threads can access stacked memory in parallel to provide higher bandwidth for various compute operations.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Memory bandwidth and latency are sometimes performance bottlenecks in processing systems. These performance factors may be improved by using stacked memory, which provides increased bandwidth and reduced intra-device through the use of, for example, through-silicon vias (TSVs) to interconnect multiple layers of stacked memory. However, thermal issues associated with stacked memory are often a limiting factor in the maximum acceptable height of the 3D memory stack, thereby limiting memory capacity available to processing units, as well as adversely affecting the proper operation of memory chips provided. For example, the processor cores in integrated circuits consume power and generate heat during normal operations, which adversely affects the performance of adjacent memory devices. Higher temperatures contribute to degradation of memory performance by leading to more frequent refresh cycles, and thereby increasing power consumption. The stacked arrangement of stacked memory further exacerbates the heat dissipation problem, because multiple heat-generating dies are in close proximity to each other and must share a heat sink. Memories, and in particular 3D stacked memories, operate within a temperature range that benefit from temperature regulation for reliable and predictable operation. Shrinking chip sizes and stacking of memory dies to allow for increased density of circuits components/memory further increases the challenge of maintaining temperatures for safe and efficient operation of processors. Accordingly, improved thermal dissipation from the 3D stacked memory improves reliability of the memory by reducing its temperature.

FIGS. 1-5 illustrate techniques for employing address swizzling in stacked memories. In various embodiments, processing systems include a 3D memory stacked on top of a compute die. In some embodiments, the compute die includes various compute units such as CPUs, GPUs, and the like. The stacked memory includes a first memory die and a second memory die stacked on top of the first memory die. Based on a parallel memory access request using a single memory address (e.g., from the compute die), the single memory address is swizzled such that the first memory die and the second memory die are accessed at different physical locations. In this way, although the memory dies are addressed with the same memory address, the physical location within each memory die being accessed are physically offset from each other. Heat generation from memory access operations are thus distributed to reduce hotspotting from repeated accesses to localized portions of the memory dies.

Figure 1:
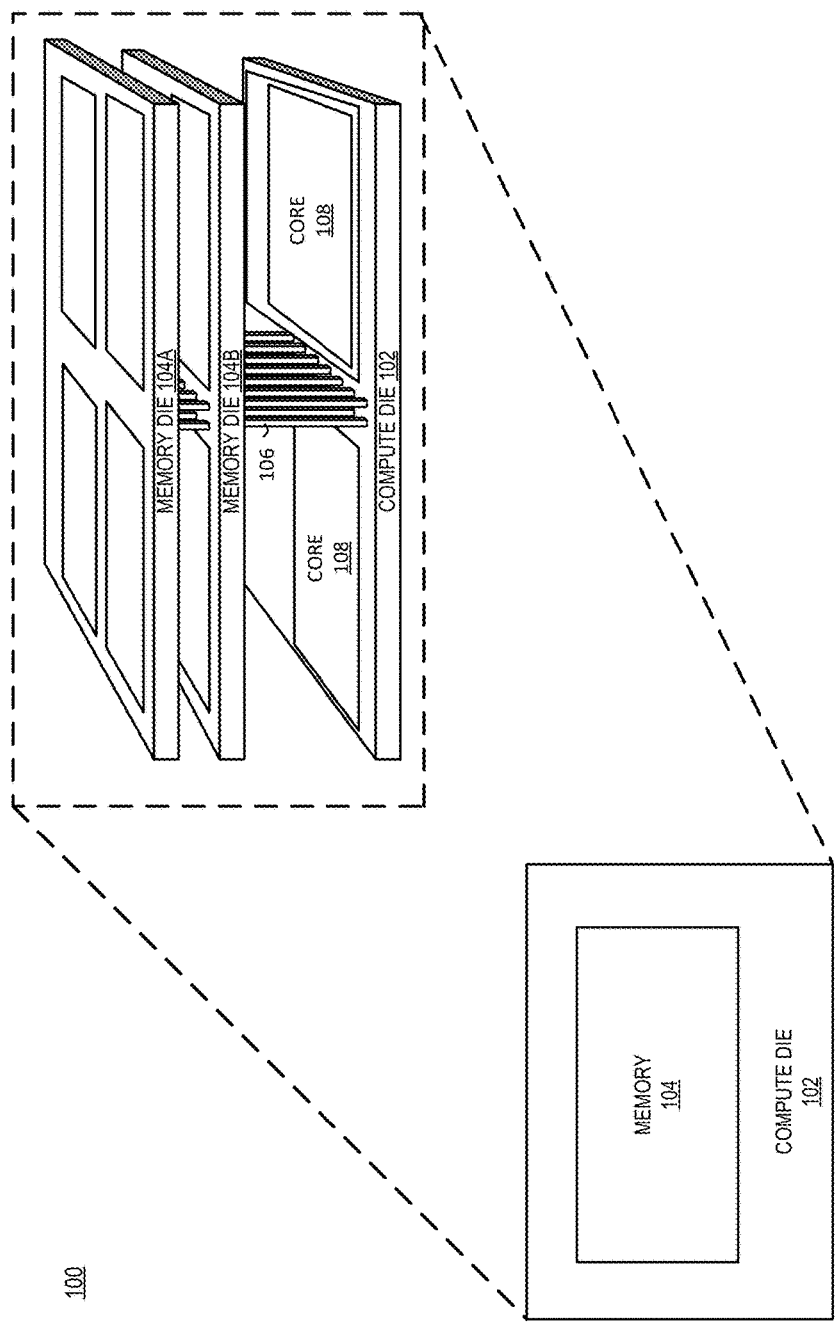
FIG. 1 is a block diagram of a processing system employing index swizzling in stacked memory in accordance with some embodiments.

FIG. 1 illustrates a block diagram of a processing system 100 employing index swizzling in stacked memory in accordance with some embodiments. The processing system 100 is generally configured to execute sets of instructions, organized as computer programs, to carry out operations for an electronic device. Accordingly, the processing system 100 can be incorporated into any of a variety of electronic devices, including a desktop or laptop computer, server, tablet, smartphone, game console, and the like. To support execution of the computer programs, the processing system 100 includes one or more compute dies 102 and a memory 104. In the depicted example of FIG. 1, the memory 104 is static random-access memory (SRAM) generally configured to store and retrieve data in response to requests from processors of the compute dice 102. As illustrated in FIG. 1, the compute die 102 and the memory 104 are arranged in a stacked-die configuration, with the memory 104 located at one or more separate memory dies (e.g., memory dies 104A and 104B) arranged in a vertically stacked die arrangement and connected to the compute dies via through-silicon vias (TSVs) 106 or other similar inter-die interconnects.

Accordingly, the memory dies 104A and 104B form a 3D stacked memory 104 including one or more coupled memory die layers, memory packages, or other memory elements. In some embodiments, the stacked memory 104 is vertically stacked while in other embodiments the stacked memory 104 is horizontally (such as side-by-side) stacked, or otherwise contains memory elements that are coupled together. Although described here in the context of SRAM, in other embodiments, a stacked memory device or system includes a memory device having a plurality of dynamic random-access memory (DRAM) or other memory technology die layers.

In one embodiment, the compute die 102 is a multi-core processor having multiple execution cores 108 to support execution of instructions for various workloads. In some embodiments, the compute die 102 includes additional modules, not illustrated at FIG. 1, to facilitate execution of instructions, including one or more additional processing units such as one or more central processing units (CPUs), GPUs, one or more digital signal processors and the like. In addition, in various embodiments the compute die 102 includes memory and input/output interface modules, such as a northbridge and a southbridge, additional memory to provide caches and other supporting memory structures for the processing units, and the like.

While FIG. 1 illustrates an implementation in which the compute die 102 is coupled below the stacked memory 104 of one or more memory die layers 104A and 104B, embodiments are not limited to this arrangement. For example, in some embodiments, the compute die 102 is located adjacent to the stacked memory 104, and thus is coupled in a side-by-side arrangement. In this illustration, the memory die layers include two memory die layers, these layers being a first memory die layer 104A and a second memory die layer 104B. However, embodiments are not limited to any particular number of memory die layers in the stacked memory 104, and other embodiments include a greater or smaller number of memory die layers.

The stacked memory 104 allows parallel access to multiple memory die layers to achieve increased bandwidth for various memory access and/or compute operations. For example, in the embodiment of FIG. 1, both memory dies 104A and 104B are simultaneously accessible by addressing accesses to the same memory address, and in which each memory die provides half the interface. It should be recognized that for each memory access, not every single memory bank within the memory dies 104A and 104B will be accessed. Rather, memory accesses are addressed to specific memory banks (or other macro area of memory dies, depending on access granularity). Under this type of memory access scheme, access patterns arise where specific banks of the memory dies 104A and 104B are accessed repeatedly, resulting in unbalanced thermal generation.

Figure 2:
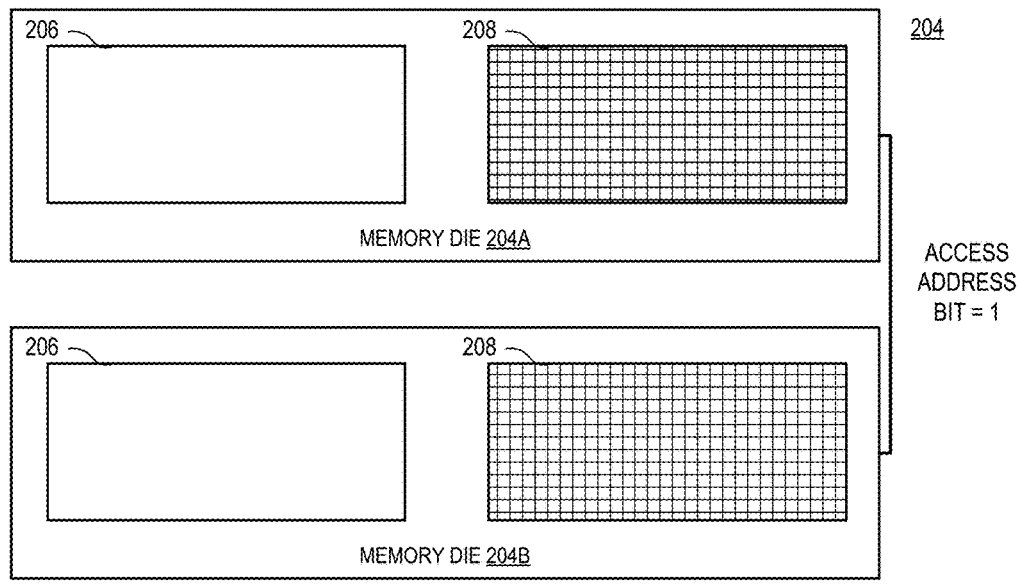
FIG. 2 is a block diagram of an example stacked memory configuration with unbalanced thermal generation in accordance with some embodiments.

For example, FIG. 2 is a block diagram of an example stacked memory configuration with unbalanced thermal generation in accordance with some embodiments. The stacked memory 204 includes two memory dies 204A and 204B having the same configuration. In particular, each memory die includes a first bank 206 and a second bank 208 dividing the memory die into halves. In this embodiment, a single bit value determines whether the first bank 206 on the left side of the memory die is accessed or whether the second bank 208 on the right side of the memory die is accessed. For example, a bit value of 0 accesses the first bank 206 and a bit value of 1 accesses the second bank 208. Repeated accesses with a bit value of 1 results in accesses to only the second bank 208 of the memory dies 204A and 204B. Therefore, heat generation from memory access operations will be limited to that localized area being accessed (i.e., right side of the memory dies 204A and 204B), resulting in unbalanced thermal generation and thermal dissipation issues, as any heat generated by the memory dies needs to travel up through the stacked memory (e.g., stacked memory 104 of FIG. 1) to be dissipated.

Figure 3:
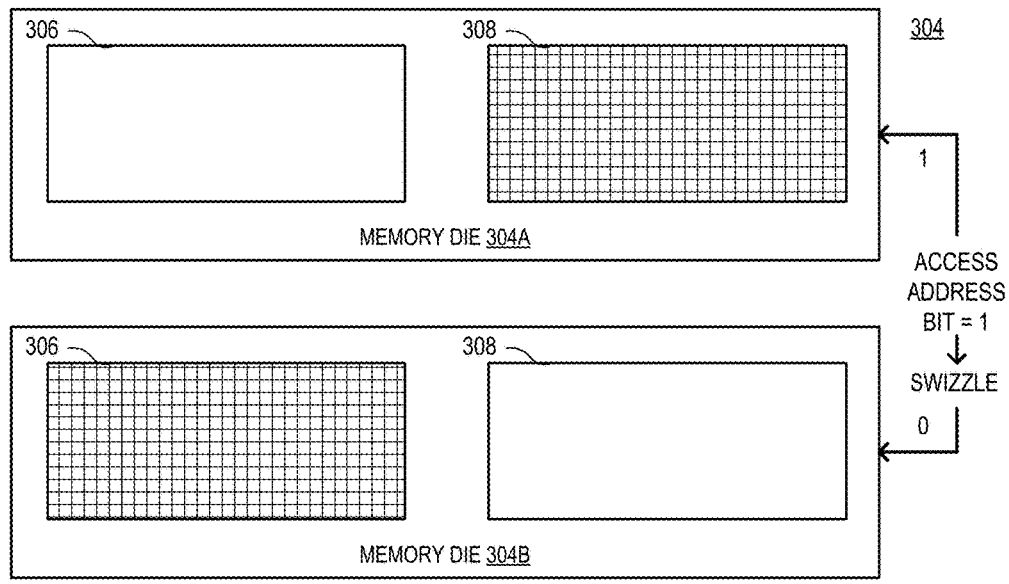
FIG. 3 is a block diagram of an example stacked memory configuration using address swizzling for thermal balancing in accordance with some embodiments.

Referring now to FIG. 3, illustrated is a block diagram of an example stacked memory configuration using address swizzling for thermal balancing in accordance with some embodiments. The stacked memory 304 includes two memory dies 304A and 304B. Each memory die includes a first bank 306 and a second bank 308 dividing the memory die into halves. By swizzling addresses for a parallel access to the memory dies 304A and 304B, the physical location where memory arrays are accessed at the memory dies 304A and 304B is changed to be offset from each other. As used herein, "swizzling" refers to permutation, transposition or otherwise rearranging the individual bits of memory addresses into a different arrangement in order to access different physical locations.

In one embodiments, a single bit value determines whether the first bank 306 on the left side of the memory die is accessed or whether the second bank 308 on the right side of the memory die is accessed. For example, a bit value of 0 in the last (least significant) bit of the memory address results in an access to the first bank 306 and a bit value of 1 in the last bit of the memory address accesses the second bank 308. As shown in FIG. 3, during a parallel access to memory dies 304A and 304B with a bit value of 1, the memory die 304A receives a bit value of 1 and therefore accesses the second bank 308. However, the bit value is swizzled for memory die 304B so that a bit value of 0 is received and the first bank 306 at memory 304B is accessed. Although both the memory dies 304A and 304B were addressed with the same bit value of 1, the physical locations of the banks being accessed are offset from each other. Therefore, in contrast to the example of FIG. 2 in which heat generation from memory access operations are localized to the right side of the stacked memory, the embodiment of FIG. 3 enables thermal balancing between the left and right sides of the memory dies 304A and 304B.

Various embodiments utilize address translation data structures and logic to swizzle the addresses between the various memory dies of stacked memory. In one embodiment, address swizzling is performed prior to sending the bit values to the memory dies. For example, in some embodiments the swizzling is performed at a memory controller (not shown) of the compute die (e.g., compute die 102 of FIG. 1). In another embodiment, the same bit value addresses are sent to both memory dies 304A and 304B and address swizzling is performed locally prior to accessing the corresponding locations within each memory die. For example, in some embodiments a local lookup table (not shown) at the memory dies 304A and 304B is utilized for swizzling. In some embodiments, the local lookup table is used to bit flip received bit values to perform address swizzling.

In another embodiment, rather than performing address swizzling, memory dies of alternating configurations are utilized in the stacked memory. For example, in reference to FIG. 2, rather than having the same configuration, addressing the memory dies 204A and 204B with the same bit value address would result in access to different banks. For example, a bit value of 0 accesses the first bank 206 of memory die 204A and a bit value of 1 accesses a second bank 208 of memory die 204A. In contrast, the configuration of memory die 204B is flipped such that a received bit value of 0 accesses the second bank 208 of memory die 204B and a bit value of 1 accesses the first bank 206 of memory die 204B.

Those skilled in the art will recognize that although the examples of FIGS. 2 and 3 show swizzling in the context of a single bit value (to determine which half of the memory die is to be accessed) for ease of discussion, in other embodiments address swizzling is applied to various access granularities without departing from the scope of this disclosure. For example, in some embodiments, swizzling is performed to access macro pages (i.e., typically larger than a typical memory page) at differing physical locations during parallel access to multiple memory die rather than the cache block granularity discussed herein. In other embodiments, swizzling is performed to access individual cache lines at differing physical locations during parallel access to multiple memory dies when a singular address is received at the memory dies.

Figure 4:
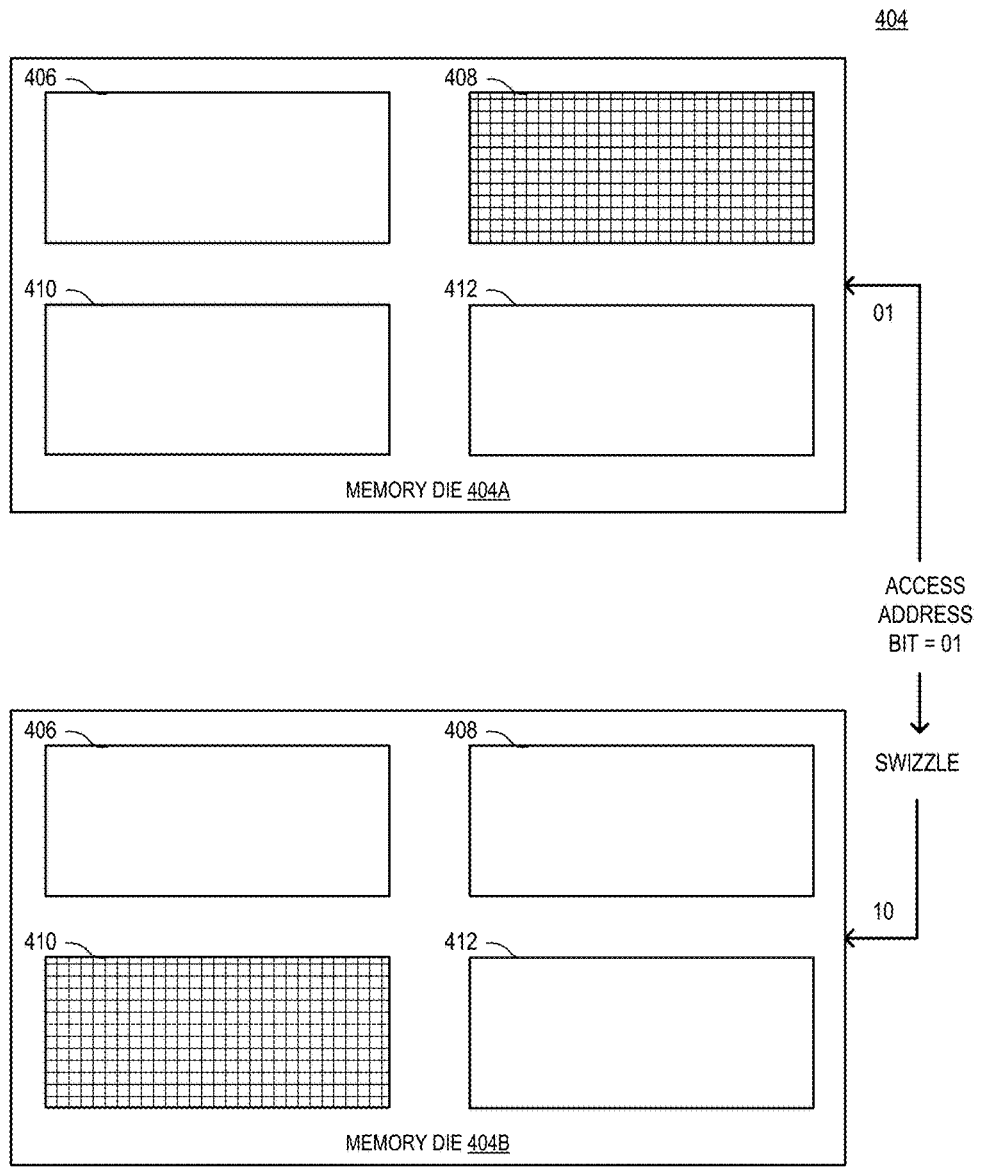
FIG. 4 is a block diagram illustrating another example stacked memory configuration using address swizzling for thermal balancing in accordance with some embodiments.

In other embodiments, bit values indicate which quadrants of a memory die are to be accessed. For example, FIG. 4 is a block diagram illustrating another example stacked memory configuration using address swizzling for thermal balancing in accordance with some embodiments. The stacked memory 404 includes two memory dies 404A and 404B having the same configuration. In particular, each memory die includes a first bank 406, a second bank 408, a third bank 410, and a fourth bank 412 dividing the memory die into quadrants. In this embodiment, a two digit bit value determines which quadrant of the memory die is accessed. For example, a bit value of 00 accesses the first bank 406, a bit value of 01 accesses the second bank 408, a bit value of 10 accesses the third bank 410, and a bit value of 11 accesses the fourth bank 412.

As shown in FIG. 4, during a parallel access to memory dies 404A and 404B with a bit value of 01, the memory die 404A receives a bit value of 01 and therefore accesses the second bank 408. However, the bit value is swizzled for memory die 404B so that a bit value of 10 is received and the third bank 410 at memory 404B is accessed. Although both the memory dies 404A and 404B were addressed with the same bit value of 01, the physical location of the banks being accessed are physically offset from each other. Therefore, the embodiment of FIG. 4 enables thermal balancing between the left and right sides of the memory dies 404A and 404B, and also provides for an improved level of granularity for thermal balancing.

Figure 5:
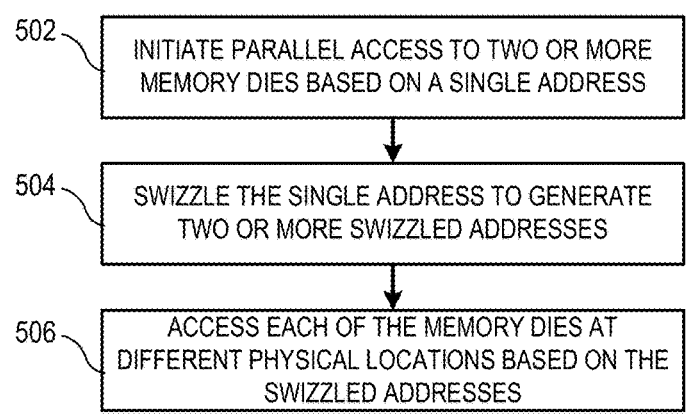
FIG. 5 is a flow diagram of a method of address swizzling at a stacked memory in accordance with some embodiments.

FIG. 5 is a flow diagram of a method 500 of address swizzling at a stacked memory in accordance with some embodiments. The method 500 is described with respect to an example implementation at the processing system 100 of FIG. 1. At block 502, the compute die 102 initiates parallel access to two or more memory dies of the stacked memory 104 based on a single memory address. At block 504, the single memory address is swizzled before accessing the two or more memory dies. As explained above, in some embodiments, the memory address swizzling is performed at a memory controller (not shown) of the compute die 102 prior to sending the bit values to the memory dies. In other embodiment, the same bit value addresses are sent to the memory dies and address swizzling is performed locally prior to accessing the corresponding locations within each memory die.

At block 506, each of the two or more memory dies of the stacked memory 104 are accessed at different physical locations, relative to each other, based on the swizzled addresses. As explained above, the swizzled addresses indicate which portions of the memory dies are to be accessed. In some embodiments, swizzling is performed to access macro pages (i.e., typically larger than a typical memory page) at differing physical locations, to differing memory blocks, cache line rows/columns, and the like. In this way, parallel access to multiple memory dies using a single memory address can be directed to access different physical locations on each die. By improving the thermal balancing of heat generated during memory access operations, localized hotspots within stacked memory may be decreased. Accordingly, the stacked memory is able to more efficiently conduct thermal energy to, for example, heat sinks for dissipation, which improves the overall processing and power efficiency of processing systems implementing the stacked memory.

In some embodiments, certain aspects of the techniques described above may be implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A processing system comprising:
a compute die; and
a stacked memory stacked with the compute die, wherein the stacked memory includes a first memory die and a second memory die stacked on top of the first memory die, and further wherein a parallel access using a single memory address is swizzled to access a first portion of the first memory die in parallel with access to a second portion of the second memory die, the second portion being offset from the first portion on a same memory die.

2. The processing system of claim 1, wherein the first memory die and the second memory die comprise an identical circuit configuration.

3. The processing system of claim 2, wherein the parallel access using the single memory address is directed towards different memory banks of the first memory die and the second memory die.

4. The processing system of claim 1, further comprising a memory controller at the compute die, wherein the memory controller swizzles the single memory address to generate a plurality of bit values prior to addressing the stacked memory.

5. The processing system of claim 1, wherein both the first memory die and the second memory die receive the single memory address, and further wherein the second memory die swizzles the single memory address based on a local lookup table.

6. The processing system of claim 5, wherein the second memory die bit flips the received single memory address based on the local lookup table.

7. The processing system of claim 1, wherein the stacked memory comprises a plurality of layers of static random-access memory (SRAM).

8. An integrated circuit (IC) package comprising:
a die-stacked memory device comprising:
a plurality of stacked memory dies, wherein a parallel access using a single memory address is swizzled to access the plurality of stacked memory dies at different physical locations, the different physical locations being offset relative to each other on a same memory die.

9. The IC package of claim 8, wherein each stacked memory die of the plurality of stacked memory dies comprise an identical circuit configuration.

10. The IC package of claim 9, wherein the parallel access using the single memory address is directed towards different memory banks of the plurality of stacked memory dies.

11. The IC package of claim 8, further comprising:
a memory controller at a compute die coupled to the die-stacked memory device, wherein the memory controller swizzles the single memory address to generate a plurality of bit values prior to addressing the die-stacked memory device.

12. The IC package of claim 8, wherein each of the plurality of stacked memory dies includes a local lookup table.

13. The IC package of claim 12, wherein the single memory address is bit flipped based on the local lookup table at each of the plurality of stacked memory dies.

14. The IC package of claim 8, wherein the die-stacked memory device comprises a plurality of layers of static random-access memory (SRAM).

15. A method comprising:
in response to receiving a parallel access request using a single memory address, swizzling the single memory address to access a first portion of a first memory die in parallel with access to a second portion of a second memory die of a die-stacked memory, the second portion being offset from the first portion on a same memory die.

16. The method of claim 15, wherein swizzling the single memory address comprises:
generating, at a memory controller, a plurality of bit values prior to addressing the first memory die and the second memory die.

17. The method of claim 15, further comprising:
addressing both the first memory die and the second memory die with the single memory address.

18. The method of claim 17, wherein swizzling the single memory address comprises:
bit flipping, at a local lookup table of the second memory die, the single memory address.

19. The method of claim 15, further comprising swizzling the single memory address based on a local lookup table at the second memory die.

20. The method of claim 15, wherein the parallel access request is directed towards different memory banks of the first memory die and the second memory die.

* * * * *